US012334324B2

(12) United States Patent
Burton

(10) Patent No.: US 12,334,324 B2
(45) Date of Patent: Jun. 17, 2025

(54) THRESHOLD-BASED IDA EXCLUSION LIST

(71) Applicant: DH TECHNOLOGIES DEVELOPMENT PTE. LTD., Singapore (SG)

(72) Inventor: Lyle Lorrence Burton, Woodbridge (CA)

(73) Assignee: DH TECHNOLOGIES DEVELOPMENT PTE. LTD., Singapore (SG)

( * ) Notice: Subject to any disclaimer, the term of this patent is extended or adjusted under 35 U.S.C. 154(b) by 531 days.

(21) Appl. No.: 17/754,614

(22) PCT Filed: Sep. 22, 2020

(86) PCT No.: PCT/IB2020/058824
§ 371 (c)(1),
(2) Date: Apr. 7, 2022

(87) PCT Pub. No.: WO2021/074716
PCT Pub. Date: Apr. 22, 2021

(65) Prior Publication Data

US 2022/0392758 A1 Dec. 8, 2022

Related U.S. Application Data

(60) Provisional application No. 62/916,759, filed on Oct. 17, 2019.

(51) Int. Cl.
*H01J 49/10* (2006.01)
*H01J 49/00* (2006.01)

(52) U.S. Cl.
CPC ...... *H01J 49/0036* (2013.01); *H01J 49/0081* (2013.01); *H01J 49/10* (2013.01)

(58) Field of Classification Search
CPC ..... H01J 49/0036; H01J 49/0081; H01J 49/10
USPC .................................................. 250/281, 282
See application file for complete search history.

(56) References Cited

U.S. PATENT DOCUMENTS

2006/0284069 A1* 12/2006 Le Blanc ........... G01N 30/8641 250/282
2013/0297226 A1* 11/2013 Wang .................... H01J 49/004 702/23
2013/0344111 A1* 12/2013 Roder .................... G16B 20/50 424/274.1

OTHER PUBLICATIONS

International Search Report and Written Opinion for PCT/IB2020/058824, mailed Dec. 15, 2020.

* cited by examiner

*Primary Examiner* — Michael Maskell
(74) *Attorney, Agent, or Firm* — Kinney & Lange, P.A.

(57) ABSTRACT

First, an MS scan of a mass range of a control sample that does not include a metabolite is performed (601) producing background peak m/z and intensity values for background precursor ions (602). Background peaks are selected for an exclusion list and in the exclusion list an m/z value and an intensity value are included for each background peak (604). Next, an MS scan of the mass range of an experimental sample that does include a metabolite is performed (610) producing peak m/z and intensity values for precursor ions (612). Peaks are selected for a peak list and in the peak list an m/z value and an intensity value are included for each peak (614). Finally, each peak of the peak list that has both an m/z value and an intensity value that correspond to an m/z value and an intensity value of a background peak of the exclusion list is excluded from the peak list (616).

12 Claims, 9 Drawing Sheets

THRESHOLD-BASED IDA EXCLUSION LIST

RELATED APPLICATIONS

This application claims the benefit of U.S. Provisional Patent Application Ser. No. 62/916,759 filed on Oct. 17, 2019, the content of which is incorporated by reference herein in its entirety.

INTRODUCTION

The teachings herein relate to mass spectrometry apparatus for detecting metabolites of a sample in an information-dependent acquisition (IDA) mass spectrometry experiment. More specifically, a mass spectrometer is operated to distinguish a metabolite ion from a background ion that has a similar mass-to-charge ratio (m/z) by including intensity and retention time parameters in an IDA exclusion list.

The apparatus and methods disclosed herein are also performed in conjunction with a processor, controller, microcontroller, or computer system, such as the computer system of FIG. 1.

Mass Spectrometry Background

Mass spectrometry (MS) is an analytical technique for detection and quantitation of chemical compounds based on the analysis of m/z values of ions formed from those compounds. MS involves ionization of one or more compounds of interest from a sample, producing precursor ions, and mass analysis of the precursor ions.

Tandem mass spectrometry or mass spectrometry/mass spectrometry (MS/MS) involves ionization of one or more compounds of interest from a sample, selection of one or more precursor ions of the one or more compounds, fragmentation of the one or more precursor ions into product ions, and mass analysis of the product ions.

Mass spectrometers are often coupled with chromatography or other separation systems in order to identify and characterize eluting compounds of interest from a sample. In such a coupled system, the compounds in the eluting solvent are ionized and a series of mass spectra are obtained at specified time intervals. These times range from, for example, 1 second to 100 minutes or greater. Intensity values derived from the series of mass spectra form a chromatogram. For example, the sum of all intensities generates a total ion chromatogram (TIC) and the intensity of one mass value generates an extracted ion chromatogram (XIC).

Peaks found in the chromatograms are used to identify or characterize a known peptide or compound in the sample because they elute at known times called retention times. More particularly, the retention times of peaks and/or the area of peaks are used to identify or characterize (quantify) a known peptide or compound in the sample.

In traditional separation coupled mass spectrometry systems, a precursor ion of a known compound is selected for analysis. An MS/MS scan is then performed at each interval of the separation for a mass range that includes the precursor ion. The intensity of the product ions found in each MS/MS scan is collected over time and analyzed as a collection of spectra, or an XIC, for example.

Both MS and MS/MS can provide qualitative and quantitative information. The measured precursor or product ion spectrum can be used to identify a molecule of interest. The intensities of precursor ions and product ions can also be used to quantitate the amount of the compound present in a sample.

A large number of different types of experimental acquisition methods or workflows can be performed using a tandem mass spectrometer. Three broad categories of these workflows are targeted acquisition, information dependent acquisition (IDA) or data-dependent acquisition (DDA), and data-independent acquisition (DIA).

In a targeted acquisition method, one or more transitions of a precursor ion to a product ion are predefined or known for a compound of interest. As a sample is being introduced into the tandem mass spectrometer, the one or more transitions are monitored during each time period or cycle of a plurality of time periods or cycles. In other words, the mass spectrometer selects and fragments the precursor ion of each transition and performs a targeted mass analysis for the product ion of the transition. As a result, an intensity (a product ion intensity) is produced for each transition. Targeted acquisition methods include, but are not limited to, multiple reaction monitoring (MRM) and selected reaction monitoring (SRM).

In an IDA method, a user can specify criteria for performing an untargeted mass analysis of product ions while a sample is being introduced into the tandem mass spectrometer. For example, in an IDA method a precursor ion or mass spectrometry (MS) survey scan is performed to generate a precursor ion peak list. The user can select criteria to filter the peak list for a subset of the precursor ions on the peak list. MS/MS is then performed on each precursor ion of the subset of precursor ions. A product ion spectrum is produced for each precursor ion. An MS survey scan followed by multiple MS/MS scans can be repeatedly (iteratively) performed on the precursor ions of the subset of precursor ions as the sample is being introduced into the tandem mass spectrometer. IDA can also be called data-dependent analysis (Thermo Fisher) or data-directed analysis (Waters). The term "DATA-DEPENDENT" is trademarked by Thermo Fisher and the term "DDA" is trademarked by Waters, for example.

Measurement of complex (e.g., biological) samples by different omics techniques, such as proteomics, metabolomics, etc. leads to different types, large numbers and wide dynamic ranges of compounds. In proteomics and many other sample types the complexity and dynamic range of compounds are very large. This poses challenges for traditional targeted and IDA methods, requiring very high-speed MS/MS acquisition to deeply interrogate the sample in order to both identify and quantify a broad range of analytes.

As a result, DIA methods, the third broad category of tandem mass spectrometry, were developed. These DIA methods have been used to increase the reproducibility and comprehensiveness of data collection from complex samples. DIA methods can also be called non-specific fragmentation methods. In a traditional DIA method, the actions of the tandem mass spectrometer are not varied among MS/MS scans based on data acquired in a previous precursor or product ion scan. Instead, a precursor ion mass range is selected. A precursor ion mass selection window is then stepped across the precursor ion mass range. All precursor ions in the precursor ion mass selection window are fragmented, and all of the product ions of all of the precursor ions in the precursor ion mass selection window are mass analyzed.

Endogenous Background Peak Problem

When performing drug metabolite identification studies, IDA is commonly performed on the samples from the dosed subjects. The resulting MS/MS spectra are used to confirm that putative metabolites are actually related to the starting drug and to localize the site of the metabolic transformation.

FIG. 2 is an exemplary diagram 200 showing how a tandem mass spectrometer that is operated to identify a drug metabolite in a simple sample using an IDA method can produce an IDA list that includes endogenous background precursor ions in addition to a metabolite precursor ion. In the IDA method of FIG. 2, the tandem mass spectrometer first performs full MS scan 210 of the simple sample. In MS scan 210, all precursor ions of the sample are selected in a mass filter, transmitted through a dissociation device, and mass analyzed in a mass analyzer. In this figure, these devices are shown as quadrupoles but can also be other types of devices. The mass analyzer produces intensity measurements for the precursor ions, as shown in precursor mass spectrum 212.

The tandem mass spectrometer then selects all precursor ions that have an intensity above a certain threshold 213. All precursor ions that have an intensity above threshold 213 are added to a threshold list 214. If the number of ions on threshold list 214 is small enough to be analyzed by MS/MS within a specified cycle time as shown in FIG. 2, threshold list 214 becomes IDA list 216. Note that IDA list 214 only includes the m/z of each precursor ion. Also, note that precursor ions that have an intensity above threshold 213 are added to threshold list 214 according to m/z value. As discussed below, however, there are other methods for selecting the order of precursor ions on threshold list 214.

For each precursor ion on IDA list 216, the tandem mass spectrometer performs an MS/MS scan. For example, in MS/MS scan 221, the precursor ion with an m/z value of 114 is selected in the mass filter, dissociated into product ions in the dissociation device, and the product ions are mass analyzed in the mass analyzer. Similarly, in MS/MS scans 222 and 223, the precursor ions with m/z values 153 and 215 from IDA list 216 are, respectively, selected and dissociated and their product ions are mass analyzed.

The product ion spectra of MS/MS scans 221, 222, and 223 are compared to known product ion spectra for a known drug to determine if they are likely to correspond to a metabolite. Note that the precursor ions with m/z values of 114 and 153 are endogenous background ion peaks. As a result, endogenous background ion peaks may also be compared to known metabolite peaks in an IDA method. For simple samples, this is not a problem.

However, for more complex samples, this may prevent an IDA method from triggering on one or all of the metabolite peaks since much of the available cycle time is used to acquire un-needed MS/MS spectra of endogenous background peaks. As a result, the drug metabolite may not be identified.

FIG. 3 is an exemplary diagram 300 showing how a tandem mass spectrometer that is operated to identify a drug metabolite in a complex sample using an IDA method can produce an IDA list that does not include a metabolite precursor ion. In the IDA method of FIG. 3, the tandem mass spectrometer first performs full MS scan 310 of the complex sample. In MS scan 310, all precursor ions of the sample are selected in a mass filter, transmitted through a dissociation device, and mass analyzed in a mass analyzer. In this figure, these devices are shown as quadrupoles but can also be other types of devices. The mass analyzer produces intensity measurements for the precursor ions, as shown in precursor mass spectrum 312.

The tandem mass spectrometer then selects all precursor ions that have an intensity above a certain threshold 313. All precursor ions that have an intensity above threshold 313 are added to a threshold list 314.

Because a complex sample is scanned, precursor mass spectrum 312 includes six endogenous background precursor ion peaks in addition to the metabolite peak, which has an m/z value of 215. If the specified cycle time only provides enough time for MS/MS scans to be performed on five precursor ion peaks, threshold list 314 is truncated to IDA list 316.

For each precursor ion on IDA list 316, the tandem mass spectrometer performs an MS/MS scan. Since there are five precursor ion peaks on IDA list 316, five MS/MS scans 321-325 are performed producing five product ion spectra.

The product ion spectra of MS/MS scans 321-325 are then compared to known product ion spectra for a known drug to determine if they are likely to correspond to a metabolite. The metabolites may not be "known" per se. Note that in precursor ion spectrum 312 metabolite precursor ion with m/z 215 is preceded by six endogenous background precursor ions. Because IDA list 316 was limited to only five precursor ion peaks, metabolite precursor ion with m/z 215 was not added to the list. As a result, the product ion spectra of MS/MS scans 321-325 only provide product ions of endogenous background precursor ions. Consequently, the known drug metabolite is not found in this case.

Performing analysis via IDA acquisition is one of the most broadly used methods of generating MS/MS information in an automated fashion. Over the years, several filters to filter the threshold peak list for a subset of precursor ions to be dissociated have been developed to optimize automated selection of the ions of interest in a specific application.

In metabolite studies, a control sample can be acquired and analyzed. The control sample is similar to the metabolite sample, but represents conditions before administration of the drug. Of course, the more similar the control sample is to the experimental sample the better. For example, a control sample can be from the same subject as for the corresponding dosed sample but before dosing Putative metabolites are found by searching for peaks which appear in the dosed but not the control sample.

It is possible to analyze the control sample by finding all peaks before acquisition of the dosed sample. It has previously been shown that this list of peaks can be used as an IDA exclusion list when acquiring the data for the dosed sample. This prevents IDA from triggering on the background peaks and thus increases the chance that MS/MS will be acquired for the actual drug metabolites of interest.

FIG. 4 is an exemplary diagram 400 showing how a tandem mass spectrometer is operated to first perform an MS scan on a control sample to produce an exclusion list and then operated to identify a drug metabolite in a complex sample by using the exclusion list in the IDA method applied to the complex sample. In the IDA method of FIG. 4, the tandem mass spectrometer first performs full MS scan 401 of a control sample. The control sample is known not to include any metabolites of interest. In MS scan 401, all precursor ions of the control sample are selected in a mass filter, transmitted through a dissociation device, and mass analyzed in a mass analyzer. In this figure, these devices are shown as quadrupoles but can also be other types of devices. The mass analyzer produces intensity measurements for the precursor ions, as shown in precursor mass spectrum 402.

The tandem mass spectrometer then selects all precursor ions that have an intensity above a certain threshold 403. All precursor ions that have an intensity above threshold 403 are added to an exclusion list 404. Since the control sample does not include the metabolite of interest, all precursor ions on exclusion list 404 are endogenous background ions.

Tandem mass spectrometer then performs a full MS scan 410 of an experimental sample known to contain the metabolite of interest. In MS scan 410, all precursor ions of the experimental sample are selected in a mass filter, transmitted through a dissociation device, and mass analyzed in a mass analyzer. In this figure, these devices are shown as quadrupoles but can also be other types of devices. The mass analyzer produces intensity measurements for the precursor ions, as shown in precursor mass spectrum 412.

The tandem mass spectrometer then selects all precursor ions that have an intensity above a certain threshold 413. All precursor ions that have an intensity above threshold 413 are added to threshold list 414. Since the experimental sample includes the metabolite of interest, threshold list 414 includes the metabolite precursor ion with m/z 215 in addition to all the endogenous background ions.

The tandem mass spectrometer removes the precursor ion peaks that are on exclusion list 404 from threshold list 414. This produces IDA list 416. IDA list 416 now includes only the metabolite precursor ion with m/z 215.

For each precursor ion on IDA list 416, the tandem mass spectrometer performs an MS/MS scan. Since there is only one precursor ion peak on IDA list 416, only MS/MS scan 421 is performed producing one product ion spectrum.

The product ion spectrum of MS/MS scan 421 is then compared to known product ion spectra for a known drug to determine if they are likely to correspond to a metabolite. Note that by using exclusion list 404 MS/MS scans are not performed on the endogenous background precursor ion peaks. This ensures that MS/MS scan 421 is performed on the metabolite precursor ion with m/z 215.

One issue with using an exclusion list derived from a control sample is that MS/MS will not be triggered for peaks for drug metabolites which have similar m/z to a background peak, even if the peak intensity is considerably larger for the drug metabolite compared to the background peak.

FIG. 5 is an exemplary diagram 500 showing how an exclusion list from an MS scan performed on a control sample can also remove a metabolite peak in an IDA method if the metabolite peak and a background peak have a similar m/z value. In the IDA method of FIG. 5, the tandem mass spectrometer first performs full MS scan 501 of a control sample. The control sample is known not to include the metabolite of interest. In MS scan 501, all precursor ions of the control sample are selected in a mass filter, transmitted through a dissociation device, and mass analyzed in a mass analyzer. In this figure, these devices are shown as quadrupoles but can also be other types of devices. The mass analyzer produces intensity measurements for the precursor ions, as shown in precursor mass spectrum 502.

The tandem mass spectrometer then selects all precursor ions that have an intensity above a certain threshold 503. All precursor ions that have an intensity above threshold 503 are added to an exclusion list 504.

Tandem mass spectrometer then performs a full MS scan 510 of an experimental sample known to contain the metabolite of interest. In MS scan 510, all precursor ions of the experimental sample are selected in a mass filter, transmitted through a dissociation device, and mass analyzed in a mass analyzer. In this figure, these devices are shown as quadrupoles but can also be other types of devices. The mass analyzer produces intensity measurements for the precursor ions, as shown in precursor mass spectrum 512.

The tandem mass spectrometer then selects all precursor ions that have an intensity above a certain threshold 513. All precursor ions that have an intensity above threshold 513 are added to threshold list 514. Since the experimental sample includes the metabolite of interest, threshold list 514 includes metabolite precursor ion 518 with m/z 190. However, there is also a background ion 517 with m/z 190. As a result, threshold list 514 includes two ion peaks with m/z 190.

Next, the tandem mass spectrometer removes the precursor ion peaks that are on exclusion list 504 from threshold list 514. Because metabolite precursor ion 518 and background ion 517 have the same m/z value of 190 they are both excluded. As a result, IDA list 516 now includes no ion peaks and no MS/MS scans are performed. Consequently, when a metabolite and a background peak have a similar m/z value, an MS/MS scan is not triggered for the drug metabolite even if a control sample and exclusion list are used.

As a result, additional systems methods for operating a tandem mass spectrometer in an IDA method are needed in order to distinguish background and metabolite ions that have a similar m/z value.

SUMMARY

A system, method, and computer program product are disclosed for excluding from a peak list in an information-dependent acquisition (IDA) mass spectrometry experiment endogenous background ions that have the same mass-to-charge ratio (m/z) as metabolite ions. The system includes an ion source device and a tandem mass spectrometer.

The tandem mass spectrometer receives an ion beam from the ion source device produced by ionizing a control sample that does not include a metabolite compound. The tandem mass spectrometer performs an MS scan of a mass range on the ion beam producing background peak m/z and intensity values for background precursor ions. The tandem mass spectrometer selects one or more of the background peaks of the background precursor ions for the exclusion list and includes in the exclusion list an m/z value and an intensity value for each background peak of the selected one or more background peaks.

The tandem mass spectrometer next creates a peak list for the IDA method by analyzing an experimental sample. The tandem mass spectrometer receives an ion beam from the ion source device produced by ionizing an experimental sample that does include the metabolite compound. The tandem mass spectrometer performs an MS scan of the mass range on the ion beam producing peak m/z and intensity values for precursor ions. The tandem mass spectrometer selects one or more of the peaks of the precursor ions for the peak list and includes in the peak list an m/z value and an intensity value for each peak of the selected one or more peaks.

Finally, the tandem mass spectrometer excludes from the peak list each peak that has both an m/z value and an intensity value that correspond to an m/z value and an intensity value of a background peak of the exclusion list.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1:
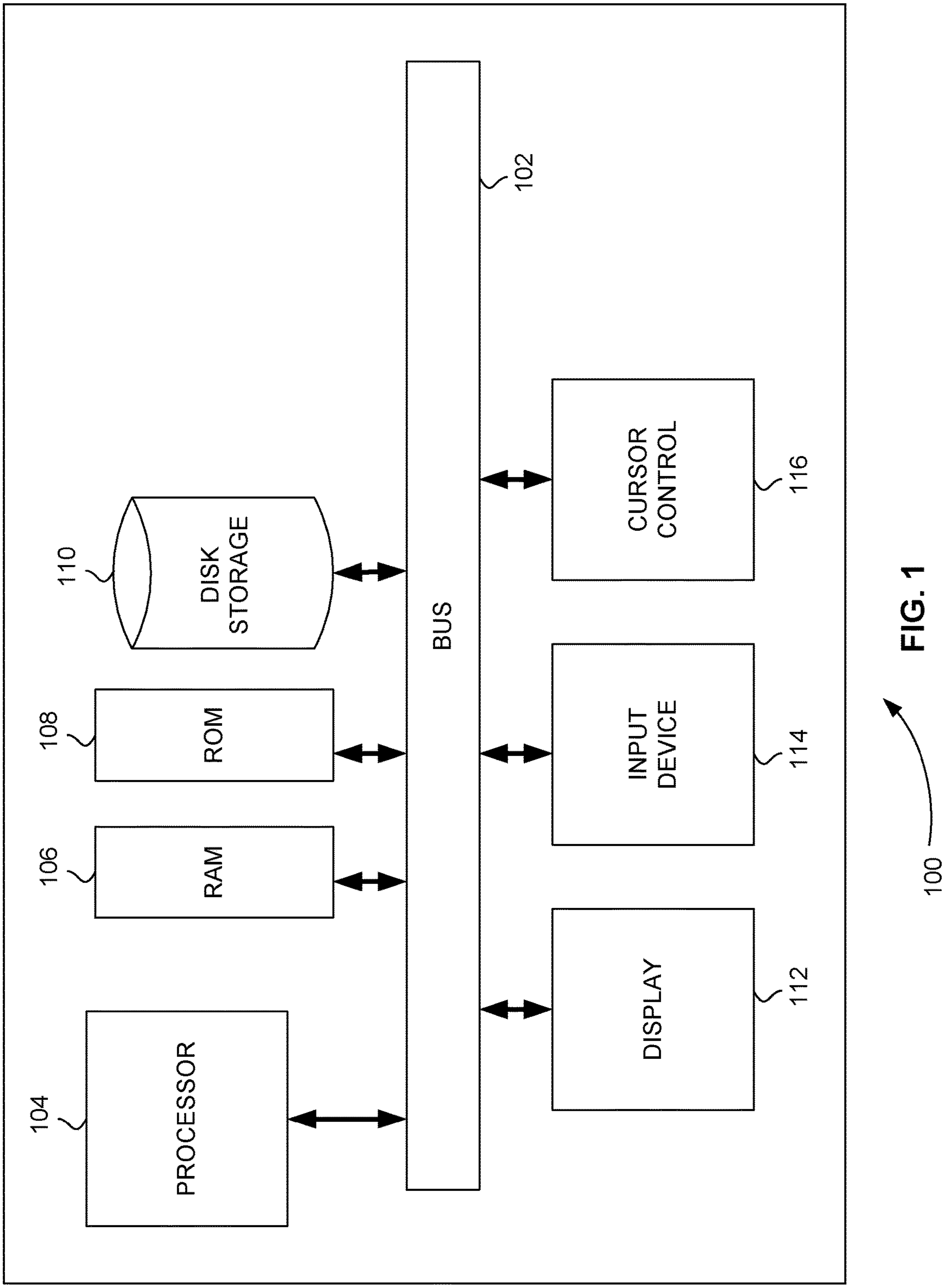
FIG. 1 is a block diagram that illustrates a computer system, upon which embodiments of the present teachings may be implemented.
Figure 2:
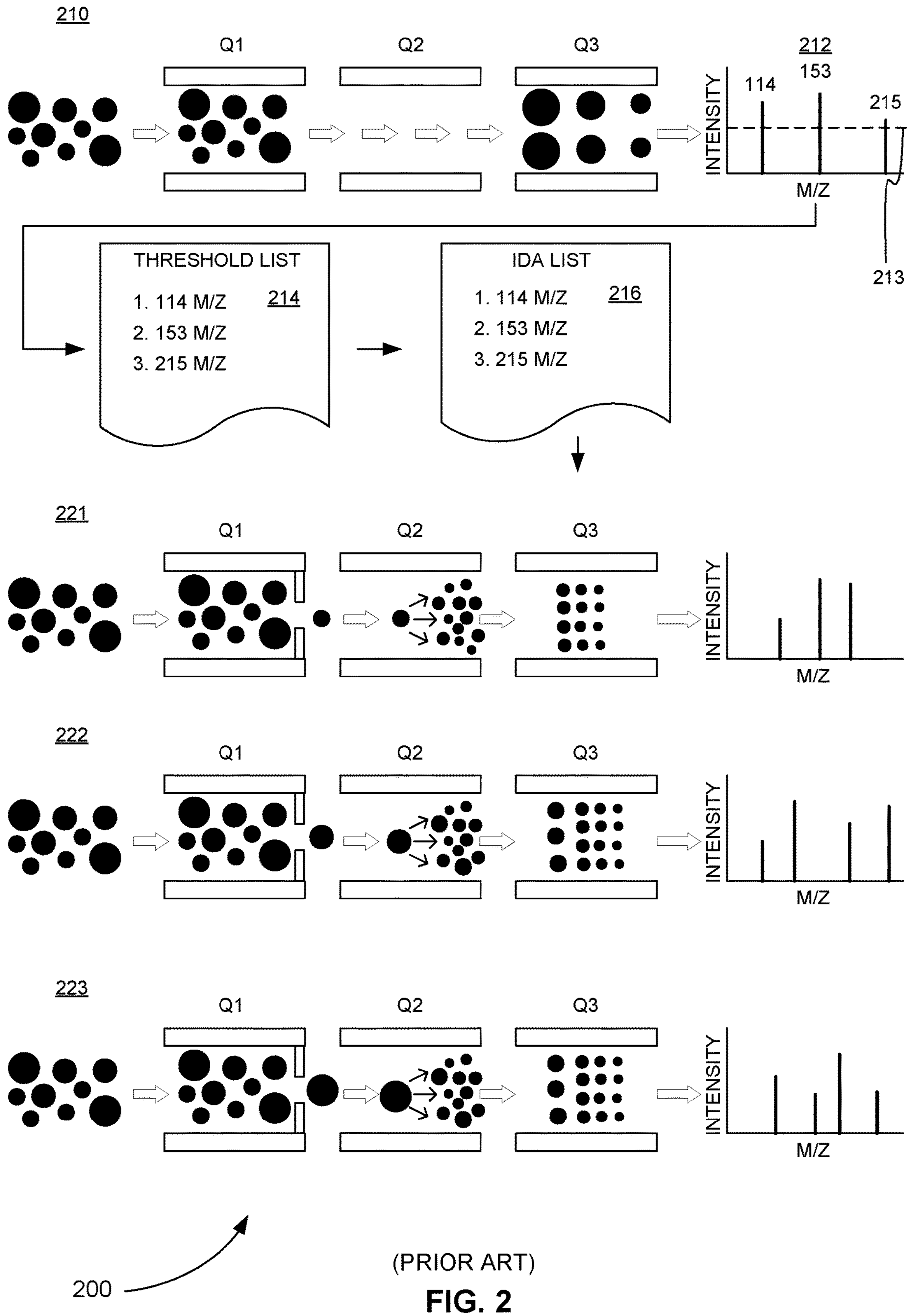
(PRIOR ART) FIG. 2
FIG. 2 is an exemplary diagram showing how a tandem mass spectrometer that is operated to identify a drug metabolite in a simple sample using an information-dependent acquisition (IDA) method can produce an IDA list that includes endogenous background precursor ions in addition to a metabolite precursor ion.
Figure 3:
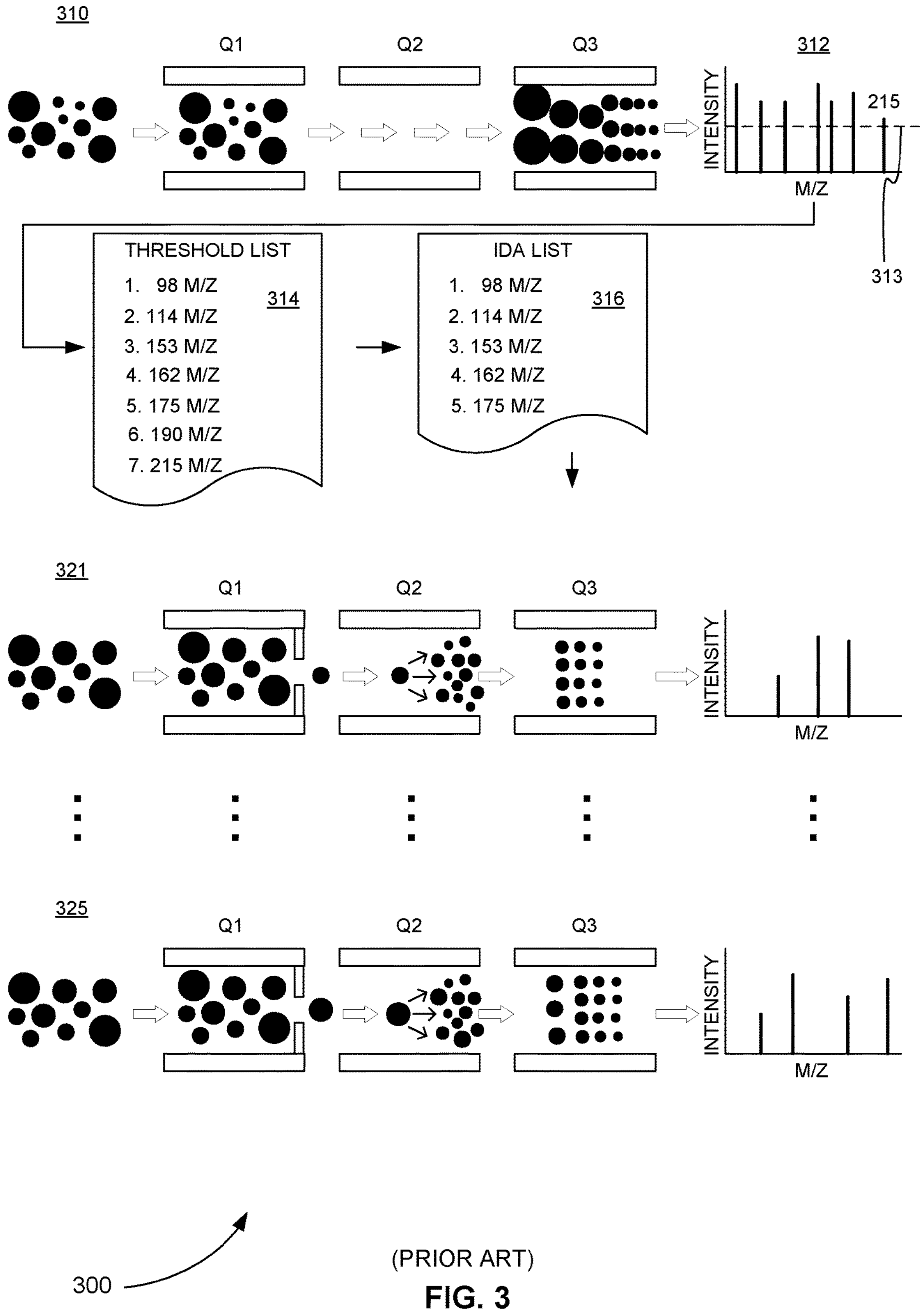
(PRIOR ART) FIG. 3
FIG. 3 is an exemplary diagram showing how a tandem mass spectrometer that is operated to identify a drug metabolite in a complex sample using an IDA method can produce an IDA list that does not include a metabolite precursor ion.
Figure 4:
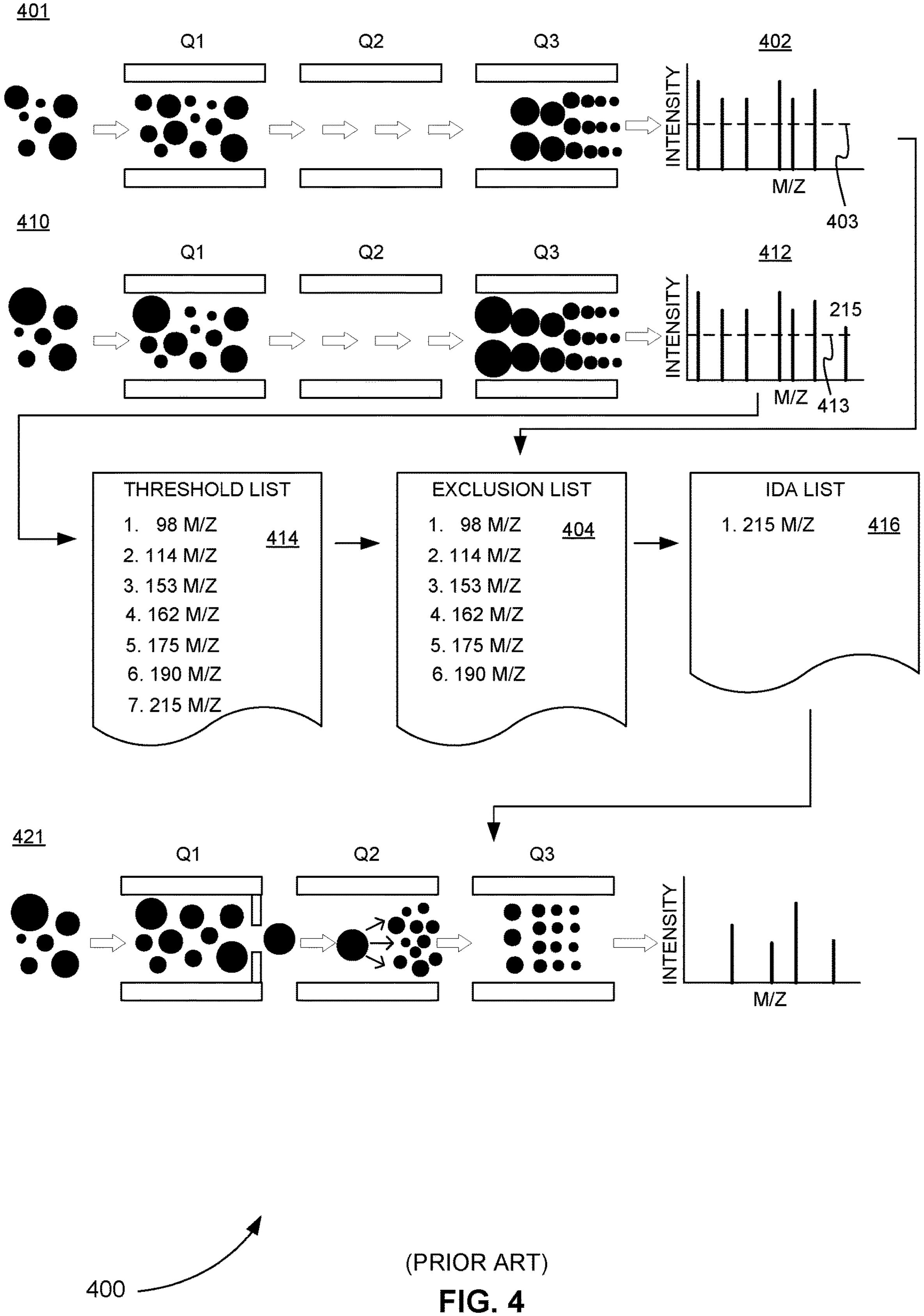
(PRIOR ART) FIG. 4
FIG. 4 is an exemplary diagram showing how a tandem mass spectrometer is operated to first perform a mass spectrometry (MS) scan on a control sample to produce an exclusion list and then operated to identify a drug metabolite in a complex sample by using the exclusion list in the IDA method applied to the complex sample.
Figure 5:
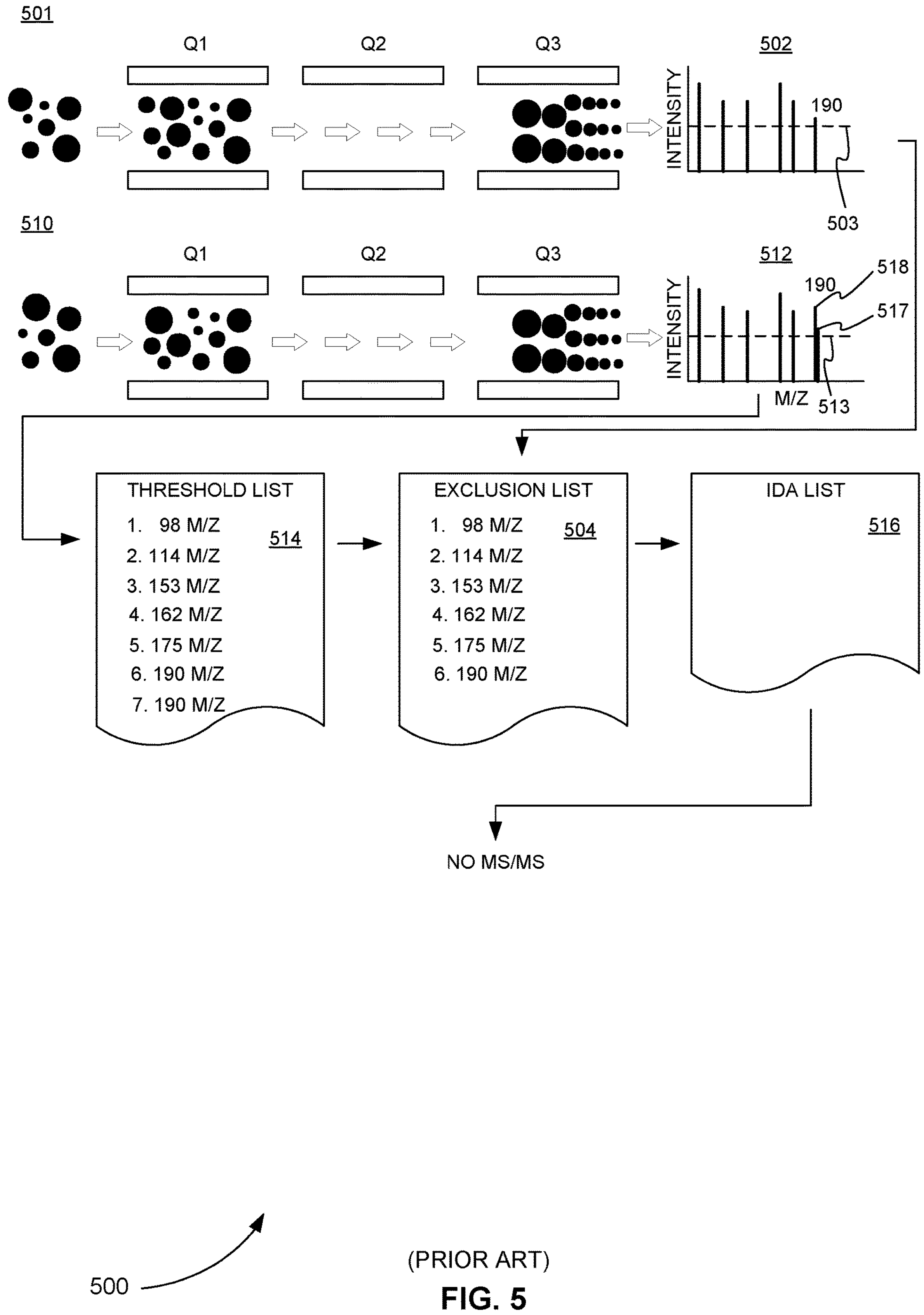
(PRIOR ART) FIG. 5
FIG. 5 is an exemplary diagram showing how an exclusion list from an MS scan performed on a control sample can also remove a metabolite peak in an IDA method if the metabolite peak and a background peak have a similar m/z value.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random-access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus, implementations of the present teachings are not limited to any specific combination of hardware circuitry and software.

In various embodiments, computer system 100 can be connected to one or more other computer systems, like computer system 100, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software, but the present teachings may be implemented as a combination of hardware and software or in hardware alone. The present teachings may be implemented with both object-oriented and non-object-oriented programming systems.

IDA Exclusion List with Intensity and Retention Time

As described above, when performing drug metabolite identification studies, IDA is commonly performed on the samples from the dosed subjects. The resulting MS/MS spectra are used to confirm that putative metabolites are actually related to the starting drug and to localize the site of the metabolic transformation. For simple samples, conventional IDA works well. However, for more complex samples, endogenous background ions can prevent an IDA method from triggering on one or all of the metabolite peaks since much of the available cycle time is used to acquire un-needed MS/MS spectra of the endogenous background peaks. As a result, the drug metabolite may not be identified.

One solution to this problem is to first analyze a similar control sample that does not contain the metabolite in order to generate a background ion peak list. This list can then be used as an IDA exclusion list when acquiring the data for the dosed sample This prevents IDA from triggering on the background peaks and thus increases the chance that MS/MS will be acquired for the actual drug metabolites of interest.

One issue with using an exclusion list derived from a control sample is that MS/MS will not be triggered for peaks for drug metabolites which have an m/z value similar a background peak. As a result, additional systems methods for operating a tandem mass spectrometer in an IDA method are needed in order to distinguish background and metabolite ions that have a similar m/z value.

In various embodiments, a tandem mass spectrometer includes the intensity of each background peak in the IDA exclusion list. Then, the IDA method triggers an MS/MS scan for the dosed sample if either there is no corresponding peak for the control sample or the peak in the control sample s smaller in intensity. A tolerance factor can be used in comparing the peak intensities. For example, the IDA method only triggers an MS/MS scan if the intensity is 1.5 or more times that of a background peak This change to the IDA method decreases the chance that a MS/MS scan would not trigger for a drug metabolite when using an exclusion list.

As described above, mass spectrometers are often coupled with chromatography or other separation systems in order to identify and characterize eluting compounds of interest from a sample. In such a coupled system, the compounds in the eluting solvent are ionized and a series of mass spectra are obtained at specified time intervals. The time it takes an analyte or metabolite to elute from injection to detection is referred to as the retention time (RT). As a result, metabolite ions can also be distinguished from endogenous background ions based on their retention times.

In various embodiments, therefore, a tandem mass spectrometer includes the intensity and retention time of each background peak in the IDA exclusion list. Then, the IDA method triggers an MS/MS scan for the dosed sample if either there is no corresponding peak for the control sample or the peak in the control sample has the same retention time and is smaller in intensity.

Figure 6:
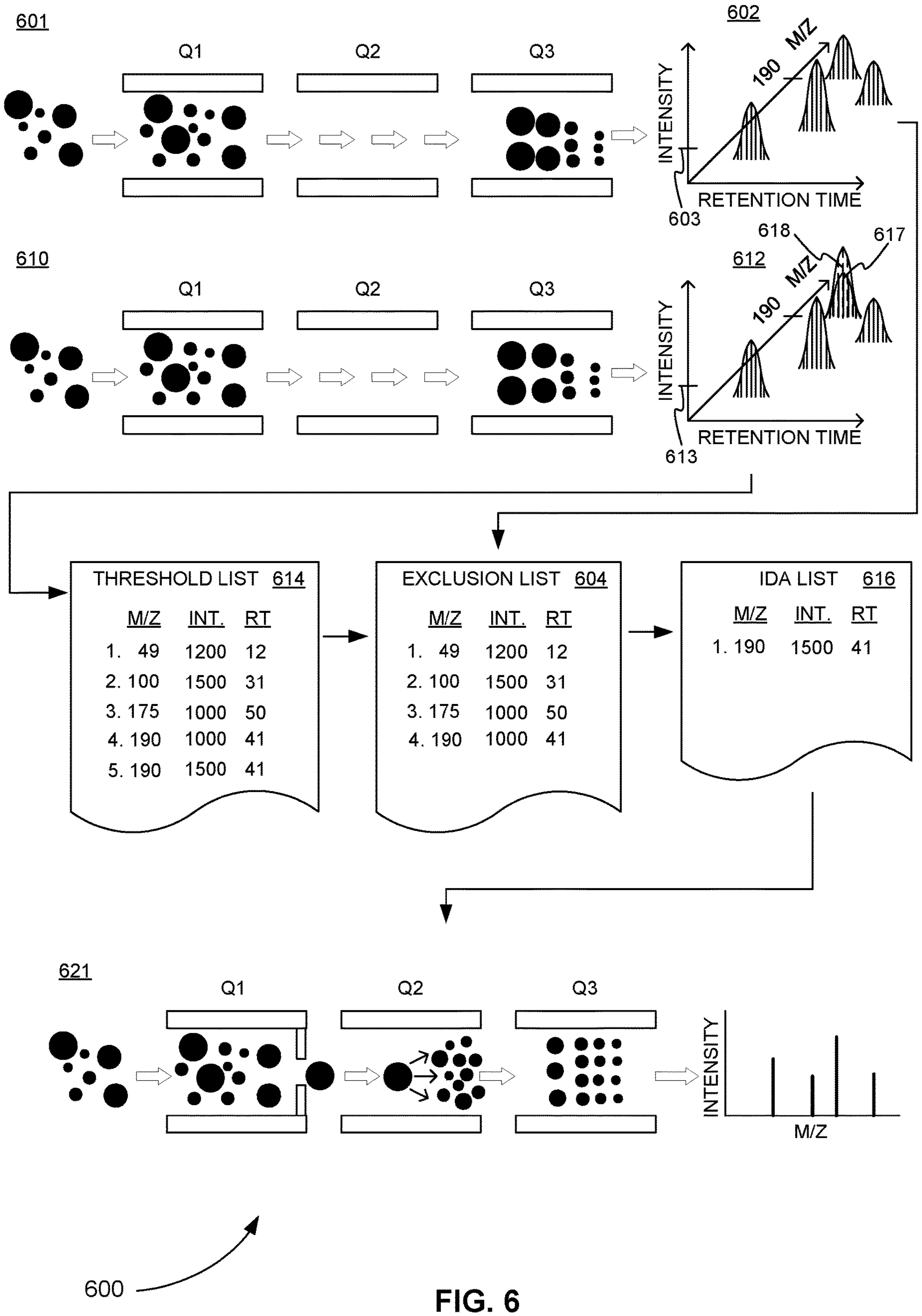
FIG. 6 is an exemplary diagram showing how adding intensity and retention time to an exclusion list from an MS scan performed on a control sample can prevent a metabolite peak from being removed in an IDA method if the metabolite peak and a background peak have a similar m/z value, in accordance with various embodiments.

FIG. 6 is an exemplary diagram 600 showing how adding intensity and retention time to an exclusion list from an MS scan performed on a control sample can prevent a metabolite peak from being removed in an IDA method if the metabolite peak and a background peak have a similar m/z value, in accordance with various embodiments. In the IDA method of FIG. 6, the tandem mass spectrometer first performs a number of full MS scans of a control sample as the control sample is eluted using a separation device. Three-dimensional chromatogram 602 shows the mass peaks produced for each of four endogenous background ions. The control sample is known not to include the metabolite of interest. In each MS scan 601 performed at a different time step, all precursor ions of the control sample are selected in a mass filter, transmitted through a dissociation device, and mass analyzed in a mass analyzer, producing a precursor ion spectrum for each time step. In this figure, these devices are shown as quadrupoles but can also be other types of devices.

At each time step, the tandem mass spectrometer then selects all peaks that have an intensity above a certain threshold 603. All precursor ion peaks that have an intensity above threshold 603 are added to an exclusion list 604. In addition, the intensity and retention time of each peak is also added to exclusion list 604, producing now three columns in exclusion list 604.

Tandem mass spectrometer then performs a number of full MS scans 610 of an experimental sample known to contain the metabolite of interest. In each MS scan 610 performed at a different time step, all precursor ions of the experimental sample are selected in a mass filter, transmitted through a dissociation device, and mass analyzed in a mass analyzer, producing a precursor ion spectrum for each time step. Three-dimensional chromatogram 612 shows the mass peaks produced.

The tandem mass spectrometer then selects all peaks that have an intensity above a certain threshold 613. All precursor ion peaks that have an intensity above threshold 613 are added to a threshold list 614. In addition, the intensity and retention time of each peak is also added to threshold list 614, producing now three columns in threshold list 614. Since the experimental sample includes the metabolite of interest, threshold list 614 includes metabolite precursor ion peak 618 with m/z 190, intensity 1500, and retention time 41 min. However, there is also a background ion peak 617 with m/z 190, intensity 1000, and retention time 41 min. As a result, threshold list 614 includes two ion peaks with m/z 190.

Next, the tandem mass spectrometer removes the precursor ion peaks that are on exclusion list 604 from threshold list 614. Previously, because metabolite precursor ion peak 618 and background ion peak 617 of threshold list 614 had the same m/z value of 190 as the background ion peak of exclusion list 604 they were both excluded.

However, now the retention times and intensities of precursor ion peak 618 and background ion peak 617 of threshold list 614 are additionally compared to the retention time and intensity of the background ion peak of exclusion list 604. From this comparison, background ion peak 617 of threshold list 614 is found to match a background ion peak of exclusion 604 and is excluded. However, even though the m/z and retention time of metabolite precursor ion peak 618 of threshold list 614 match the m/z and retention time of a background ion peak of exclusion 604, the intensity does not. As a result, metabolite precursor ion peak 618 of threshold list 614 is not excluded and is, therefore, added to IDA list 616. Note that all other peaks of threshold list 614 match peaks of exclusion list 604 and are excluded.

Also note that although IDA list 616 is shown as separate list, IDA list 616 can simply be threshold list 614 after peaks are excluded. Further note that threshold list 614 is constantly being updated and excluded in real-time as peaks are being acquired during a separation, so IDA list 616 is also constantly changing during the separation.

During the separation, for each precursor ion peak on IDA list 616, the tandem mass spectrometer performs an MS/MS scan while the precursor ion peak is on IDA list 616. Since, in this case, there is only one precursor ion peak on IDA list 616, only MS/MS scans 621 are performed as long as metabolite precursor ion peak 618 is on IDA list 616, producing a product ion spectrum for each MS/MS scan.

The product ion spectra of MS/MS scans 621 are then compared to known product ion spectra for a known drug to determine if they are likely to correspond to a metabolite. Note that by using exclusion list 604 with additional intensity and retention time parameter values, MS/MS scans are not performed on both the endogenous background precursor ion peaks and metabolite ion peaks that have similar m/z values but different intensities or different retention times. In other words, metabolite ion peaks are no longer incorrectly excluded.

In various embodiments, when comparing m/z, retention time, and intensity between threshold lists and exclusion lists a different tolerance factor for matching values of each parameter is used. For example, the tolerance factor for intensity can be, but is not limited to, a factor of 1.5. This means that an MS/MS scan is only triggered for a peak of threshold list 614 if the intensity is 1.5 times the intensity of a peak on exclusion list 604 if the m/z and retention also match.

Note that the concentration of the control sample and the experimental may be different. As a result, in various embodiments, the intensities of threshold list 614 or exclusion list 604 are scaled before the two lists are compared. For example, control and experimental urine samples may have different volumes. Urine is known to naturally contain certain compounds such as creatinine. As a result, the ratio of the intensities for creatinine in the threshold list and the exclusion list can be used to scale all the intensities in the threshold list or the exclusion list.

System for Excluding Background Peaks from a Peak List

Figure 7:
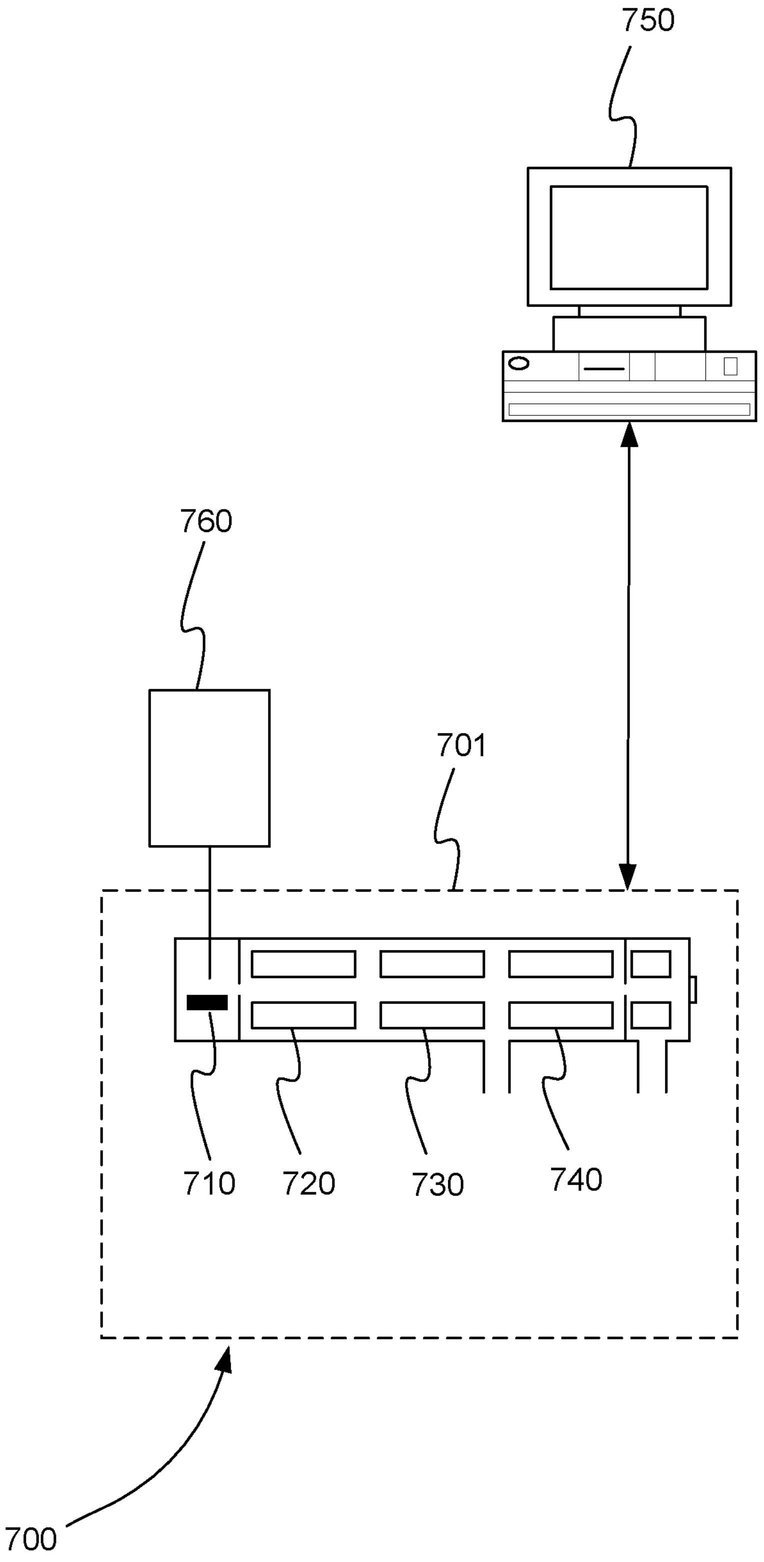
FIG. 7 is a schematic diagram of apparatus for excluding from a peak list in an IDA mass spectrometry experiment endogenous background ions that have the same m/z as metabolite ions, in accordance with various embodiments.

FIG. 7 is a schematic diagram 700 of apparatus for excluding from a peak list in an IDA mass spectrometry experiment endogenous background ions that have the same m/z as metabolite ions, in accordance with various embodiments. The system of FIG. 7 includes ion source device 710 and tandem mass spectrometer 701.

Ion source device 710 can be, but is not limited to, an electrospray ion source (ESI) device, a chemical ionization (CI) source device such as an atmospheric pressure chemical ionization source (APCI) device, atmospheric pressure photoionization (APPI) source device, or a matrix-assisted laser desorption source (MALDI) device. In an exemplary embodiment, ion source device 710 is an ESI device.

Tandem mass spectrometer 701 includes a mass filter device 720, a dissociation device 730, and a mass analyzer 740, for example. In the system of FIG. 7, mass filter device 720, a dissociation device 730, and a mass analyzer 740 are shown as quadrupole devices. One of ordinary skill in the art can appreciate that any of these stages can include other types of mass spectrometry devices including, but not limited to, ion traps, orbitraps, ion mobility devices, time-of-flight (TOF) devices, electron-based dissociation (ExD) collision cells, or Fourier transform ion cyclotron resonance (FT-ICR) devices.

Tandem mass spectrometer 701 first creates an exclusion list by analyzing a control sample. Tandem mass spectrometer 701 receives an ion beam from ion source device 710 produced by ionizing a control sample that does not include a metabolite compound. Note that in FIG. 7, ion source device 710 is shown as part of a tandem mass spectrometer 701. However, ion source device 710 can also be a separate device.

Tandem mass spectrometer 701 performs an MS scan of a mass range on the ion beam producing background peak m/z and intensity values for background precursor ions. Tandem mass spectrometer 701 selects one or more of the background peaks of the background precursor ions for the exclusion list and includes in the exclusion list an m/z value and an intensity value for each background peak of the selected one or more background peaks.

Tandem mass spectrometer 701 next creates a peak list for the IDA method by analyzing an experimental sample. Tandem mass spectrometer 701 receives an ion beam from the ion source device produced by ionizing an experimental sample that does include the metabolite compound. Tandem mass spectrometer 701 performs an MS scan of the mass range on the ion beam producing peak m/z and intensity values for precursor ions. Tandem mass spectrometer 701 selects one or more of the peaks of the precursor ions for the peak list and includes in the peak list an m/z value and an intensity value for each peak of the selected one or more peaks.

Finally, tandem mass spectrometer 701 excludes each peak of the peak list that has both an m/z value and an intensity value that correspond to an m/z value and an intensity value of a background peak of the exclusion list.

In various embodiments, tandem mass spectrometer 701 further performs an MS/MS scan of each precursor ion peak on the peak list in order to identify the metabolite compound.

In various embodiments, tandem mass spectrometer 701 selects one or more of the peaks of the precursor ions for the peak list by selecting the first N peaks measured above a certain threshold intensity level. In another embodiments, tandem mass spectrometer 701 selects one or more of the peaks of the precursor ions for the peak list by selecting N peaks with the highest intensity.

In various embodiments, an m/z value, and an intensity value of a peak of the peak list correspond to an m/z value and an intensity value of a background peak of the exclusion list if the m/z values match within an m/z tolerance factor and if the intensity values match within an intensity tolerance factor. As described above, the intensity tolerance factor can be 1.5 times the intensity of the background peak of the exclusion list, for example.

In various embodiments, tandem mass spectrometer 701 further scales the peak list or the exclusion list before comparing and matching peaks in the two lists. As described above, a single known background peak can be used to scale the peak list or the exclusion list. For example, tandem mass spectrometer 701 selects one known background peak that is on the peak list and the exclusion list. Tandem mass spectrometer 701 calculates a ratio of the intensity value of the one known background peak on the peak list and the intensity value of the one known background peak on the exclusion list. Tandem mass spectrometer 701 then multiplies each intensity value on the peak list or the exclusion list by the ratio.

In various embodiments, two or more background ions can be used to scale the peak list or the exclusion list. For example, tandem mass spectrometer 701 selects two or more known background peaks that are on the peak list and the exclusion list. Tandem mass spectrometer 701 calculates a ratio of a combination of the intensity values of the two or more known background peaks on the peak list and a combination of the intensity values of the two or more known background peaks on the exclusion list. A combination of the intensity values of the two or more known background peaks can be, but is not limited to, the average, the median, or an intensity-weighted average. Tandem mass spectrometer 701 then multiplies each intensity value on the peak list or the exclusion list by the ratio.

In various embodiments, tandem mass spectrometer 701 further includes sample introduction device 760. Sample introduction device 760 introduces one or more compounds of interest from a sample to ion source device 710 over time, for example. Sample introduction device 760 can perform techniques that include, but are not limited to, injection, liquid chromatography, gas chromatography, capillary electrophoresis, or ion mobility.

When using sample introduction device 760, tandem mass spectrometer 701 receives an ion beam from ion source device 710 that receives one or more compounds from the control sample over time from sample introduction device 760. Tandem mass spectrometer 701 then performs a plurality of MS scans of the mass range at a plurality of different time steps on the ion beam producing background peak m/z and intensity values for background precursor ions over time. At each time step, tandem mass spectrometer 701 selects one or more of the background peaks of the background precursor ions for the exclusion list and includes in the exclusion list an m/z value, an intensity value, and a retention time value for each background peak of the selected one or more of the background peaks.

Next, tandem mass spectrometer 701 receives an ion beam from ion source device 710 that receives one or more compounds from the experimental sample overtime from sample introduction device 760. Tandem mass spectrometer 701 performs a plurality of MS scans of the mass range at a plurality of different time steps on the ion beam producing peak m/z and intensity values for precursor ions over time. For each time step, tandem mass spectrometer 701 selects one or more of the peaks of the precursor ions for the peak list and includes in the peak list an m/z value, an intensity value, and a retention time value for each peak of the selected one or more peaks.

Finally, tandem mass spectrometer 701 excludes from the peak list each peak that has an m/z value, an intensity value and a retention time that correspond to an m/z value, an intensity value, and a retention time of a background peak of the exclusion list.

In various embodiments, an m/z value, an intensity value and a retention time of a peak of the peak list correspond to an m/z value, an intensity value, and a retention time of a background peak of the exclusion list if the m/z values match within an m/z tolerance factor, if the intensity values match within an intensity tolerance factor, and if the retention time values match within a retention time tolerance factor.

In various embodiments, a processor 750 can be used to control or instruct tandem mass spectrometer 701 to perform any of the steps described above or to independently perform one or more of the steps described above. Processor 750 controls or provides instructions by, for example, controlling one or more voltage, current, or pressure sources (not shown). Processor 750 can be, but is not limited to, a computer, a microprocessor, the computer system of FIG. 1, or any device capable of sending and receiving control signals and data from a tandem mass spectrometer and processing data. Processor 750 is in communication with tandem mass spectrometer 701. Processor 750 is shown as a separate device but can be a processor or controller of tandem mass spectrometer 701 or another device.

Method for Excluding Background Peaks from a Peak List

Figure 8:
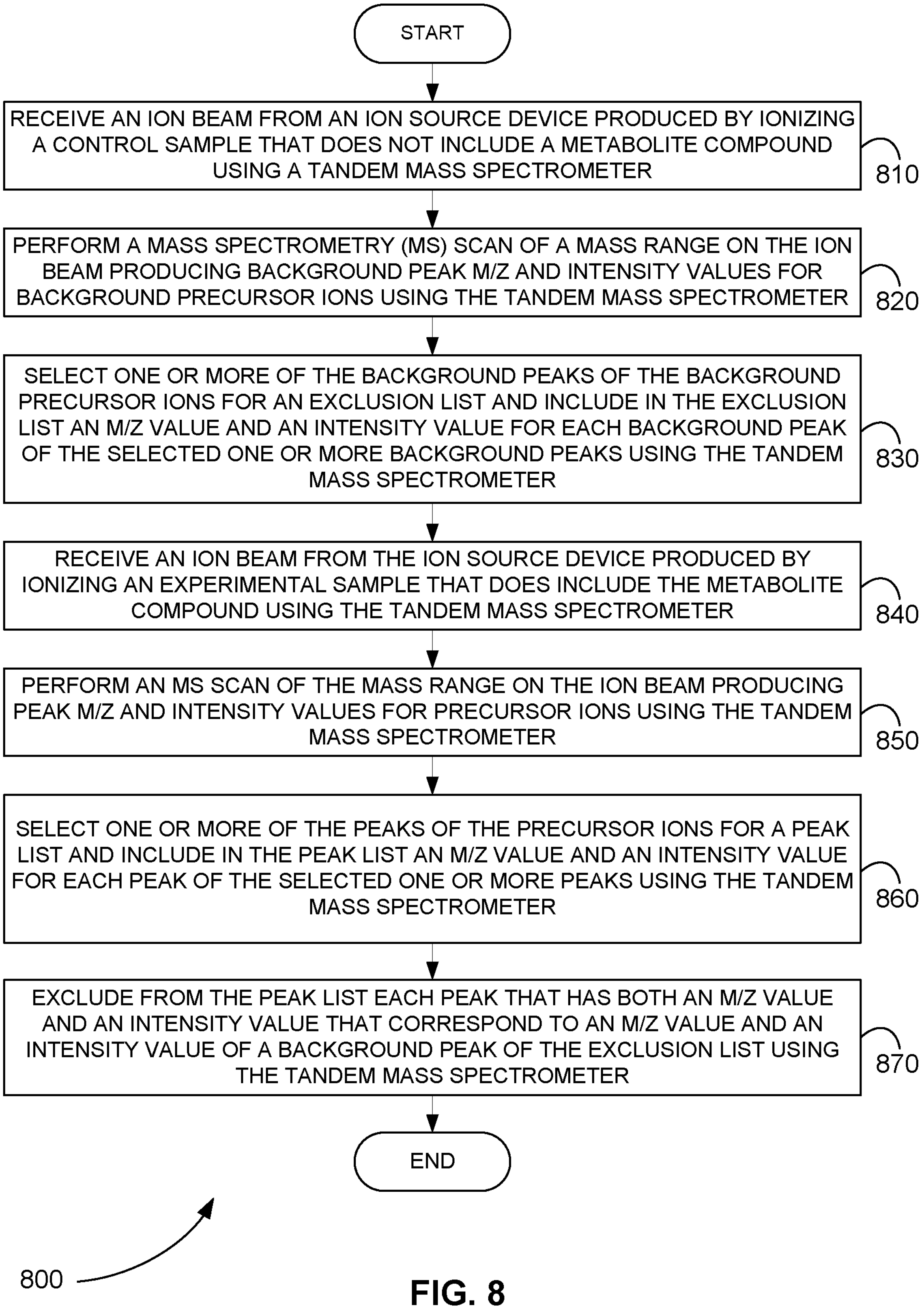
FIG. 8 is a flowchart showing a method 800 for excluding from a peak list in an IDA mass spectrometry experiment endogenous background ions that have the same m/z as metabolite ions, in accordance with various embodiments.

FIG. 8 is a flowchart showing a method 800 for excluding from a peak list in an IDA mass spectrometry experiment endogenous background ions that have the same m/z as metabolite ions, in accordance with various embodiments.

In step 810 of method 800, an ion beam is received from an ion source device produced by ionizing a control sample that does not include a metabolite compound using a tandem mass spectrometer.

In step 820, a mass spectrometry (MS) scan of a mass range is performed on the ion beam producing background peak m/z and intensity values for background precursor ions using the tandem mass spectrometer.

In step 830, one or more of the background peaks of the background precursor ions are selected for an exclusion list and in the exclusion list an m/z value and an intensity value are included for each background peak of the selected one or more background peaks using the tandem mass spectrometer.

In step 840, an ion beam is received from the ion source device produced by ionizing an experimental sample that does include the metabolite compound using the tandem mass spectrometer.

In step 850, an MS scan of the mass range is performed on the ion beam producing peak m/z and intensity values for precursor ions using the tandem mass spectrometer.

In step 860, one or more of the peaks of the precursor ions are selected for a peak list and in the peak list an m/z value and an intensity value are included for each peak of the selected one or more peaks using the tandem mass spectrometer.

In step 870, each peak of the peak list is excluded that has both an m/z value and an intensity value that correspond to an m/z value and an intensity value of a background peak of the exclusion list using the tandem mass spectrometer.

Computer Program Product for Excluding Background Peaks from a Peak List

In various embodiments, computer program products include a tangible computer-readable storage medium whose contents include a program with instructions being executed on a processor so as to perform a method for excluding from a peak list in an IDA mass spectrometry experiment endogenous background ions that have the same m/z as metabolite ions. This method is performed by a system that includes one or more distinct software modules.

Figure 9:
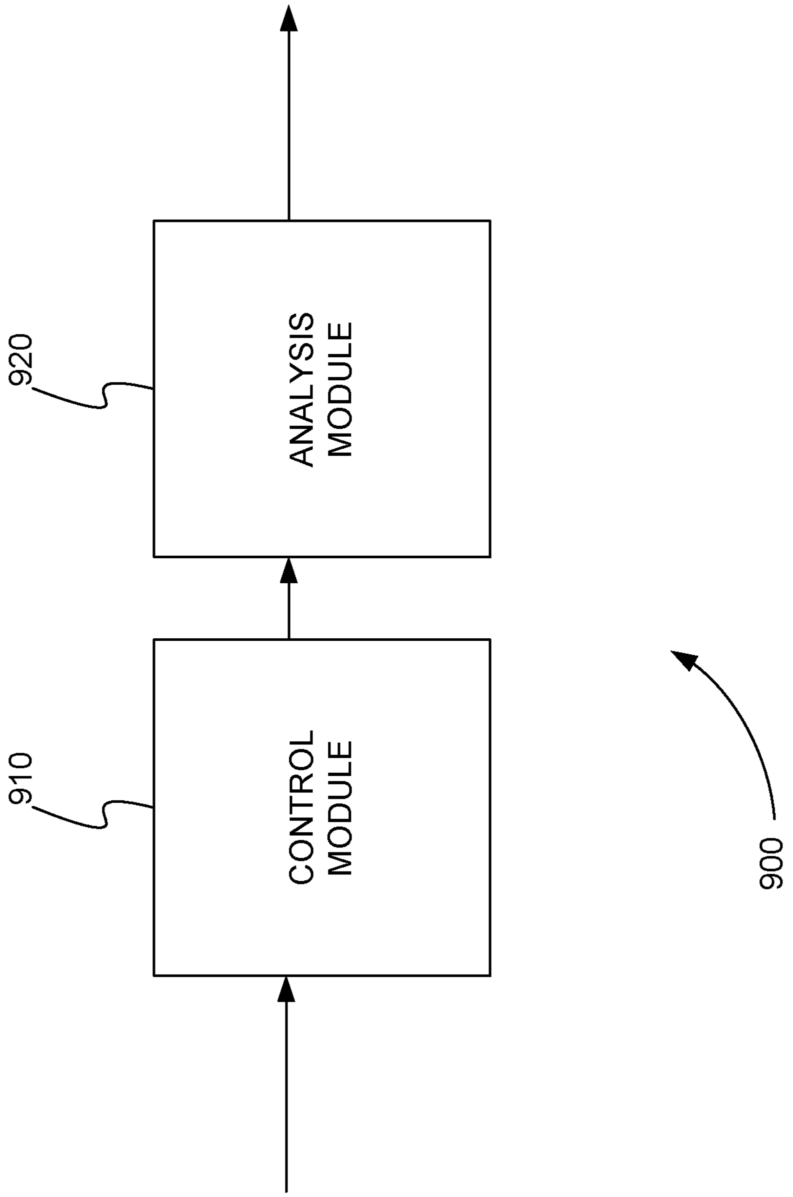
FIG. 9 is a schematic diagram of a system that includes one or more distinct software modules that performs a method for excluding from a peak list in an IDA mass spectrometry experiment endogenous background ions that have the same m/z as metabolite ions, in accordance with various embodiments.

FIG. 9 is a schematic diagram of a system 900 that includes one or more distinct software modules that performs a method for excluding from a peak list in an IDA mass spectrometry experiment endogenous background ions that have the same m/z as metabolite ions, in accordance with various embodiments. System 900 includes control module 910 and analysis module 920.

Control module 910 instructs a tandem mass spectrometer to receive an ion beam from an ion source device produced by ionizing a control sample that does not include a metabolite compound. Control module 910 instructs the tandem mass spectrometer to perform an MS scan of a mass range on the ion beam producing background peak m/z and intensity values for background precursor ions. Analysis module 920 selects one or more of the background peaks of the background precursor ions for an exclusion list and includes in the exclusion list an m/z value and an intensity value for each background peak of the selected one or more background peaks.

Control module 910 instructs the tandem mass spectrometer to receive an ion beam from the ion source device produced by ionizing an experimental sample that does include the metabolite compound. Control module 910 instructs the tandem mass spectrometer to perform an MS scan of the mass range on the ion beam producing peak m/z and intensity values for precursor ions. Analysis module 920 selects one or more of the peaks of the precursor ions for a peak list and includes in the peak list an m/z value and an intensity value for each peak of the selected one or more peaks. Finally, analysis module 920 excludes from the peak list each peak that has both an m/z value and an intensity value that correspond to an m/z value and an intensity value of a background peak of the exclusion list.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for excluding from a peak list in an information dependent acquisition (IDA) mass spectrometry experiment endogenous background ions that have the same mass-to-charge ratio (m/z) as metabolite ions, comprising:

an ion source device; and a tandem mass spectrometer that (a) creates an exclusion list by receiving an ion beam from the ion source device produced by ionizing a control sample that does not include a metabolite compound, performing a mass spectrometry (MS) scan of a mass range on the ion beam producing background peak m/z and intensity values for background precursor ions, selecting one or more of the background peaks of the background precursor ions for the exclusion list, and including in the exclusion list an m/z value and an intensity value for each background peak of the selected one or more background peaks, (b) creates a peak list by receiving an ion beam from the ion source device produced by ionizing an experimental sample that does include the metabolite compound, performing an MS scan of the mass range on the ion beam producing peak m/z and intensity values for precursor ions, selecting one or more of the peaks of the precursor ions for the peak list, and including in the peak list an m/z value and an intensity value for each peak of the selected one or more peaks, (c) scales intensities of the peak list or the exclusion list by:

selecting one known background peak that is on the peak list and the exclusion list, calculating a ratio of the intensity value of the one known background peak on the peak list and the intensity value of the one known background peak on the exclusion list, and multiplying each intensity value on the peak list or the exclusion list by the ratio, and (d) excludes from the peak list each peak that has both an m/z value and an intensity value that correspond to an m/z value and an intensity value of a background peak of the exclusion list.

2. The system of claim 1, wherein an m/z value, and an intensity value of a peak of the peak list correspond to an m/z value and an intensity value of a background peak of the exclusion list if the m/z values match within an m/z tolerance factor and if the intensity values match within an intensity tolerance factor.

3. The system of claim 1, wherein the tandem mass spectrometer further scales the peak list or the exclusion list before comparing peaks in step (d).

4. The system of claim 1, wherein the tandem mass spectrometer further scales intensities of the peak list or the exclusion list by selecting two or more known background peaks that are on the peak list and the exclusion list, calculating a ratio of a combination of the intensity values of the two or more known background peaks on the peak list and a combination of the intensity values of the two or more known background peaks on the exclusion list, and multiplying each intensity value on the peak list or the exclusion list by the ratio.

5. The system of claim 1, wherein the tandem mass spectrometer further includes a sample introduction device wherein the tandem mass spectrometer further in step (a) receives an ion beam from the ion source device that receives one or more compounds from the control sample over time from the sample introduction device, performs a plurality of MS scans of the mass range at a plurality of different time steps on the ion beam producing background peak m/z and intensity values for background precursor ions over time, at each time step, selects one or more of the background peaks of the background precursor ions for the exclusion list, and includes in the exclusion list an m/z value, an intensity value, and a retention time value for each background peak of the selected one or more of the background peaks, in step (b) receives an ion beam from the ion source device that receives one or more compounds from the experimental sample over time from the sample introduction device, performs a plurality of MS scans of the mass range at a plurality of different time steps on the ion beam producing peak m/z and intensity values for precursor ions over time, at each time step, selects one or more of the peaks of the precursor ions for the peak list, and includes in the peak list an m/z value, an intensity value, and a retention time value for each peak of the selected one or more peaks, and in step (d) excludes from the peak list each peak that has an m/z value, an intensity value and a retention time that correspond to an m/z value, an intensity value, and a retention time of a background peak of the exclusion list.

6. The system of claim 1, wherein an m/z value, an intensity value and a retention time of a peak of the peak list correspond to an m/z value, an intensity value, and a retention time of a background peak of the exclusion list if the m/z values match within an m/z tolerance factor, if the intensity values match within an intensity tolerance factor, and if the retention time values match within a retention time tolerance factor.

7. A method for excluding from a peak list in an information dependent acquisition (IDA) mass spectrometry experiment endogenous background ions that have the same mass-to-charge ratio (m/z) as metabolite ions, comprising:

receiving an ion beam from an ion source device produced by ionizing a control sample that does not include a metabolite compound using a tandem mass spectrometer; performing a mass spectrometry (MS) scan of a mass range on the ion beam producing background peak m/z and intensity values for background precursor ions using the tandem mass spectrometer;

selecting one or more of the background peaks of the background precursor ions for an exclusion list and including in the exclusion list an m/z value and an intensity value for each background peak of the selected one or more background peaks using the tandem mass spectrometer;

receiving an ion beam from the ion source device produced by ionizing an experimental sample that does include the metabolite compound using the tandem mass spectrometer;

performing an MS scan of the mass range on the ion beam producing peak m/z and intensity values for precursor ions using the tandem mass spectrometer;

selecting one or more of the peaks of the precursor ions for a peak list and including in the peak list an m/z value and an intensity value for each peak of the selected one or more peaks using the tandem mass spectrometer;

scaling the peak list or the exclusion list by:

selecting one known background peak that is on the peak list and the exclusion list, calculating a ratio of the intensity value of the one known background peak on the peak list and the intensity value of the one known background peak on the exclusion list, and multiplying each intensity value on the peak list or the exclusion list by the ratio; and excluding, after scaling the peak list or the exclusion list, from the peak list each peak that has both an m/z value and an intensity value that correspond to an m/z value and an intensity value of a background peak of the exclusion list using the tandem mass spectrometer.

8. The method of claim 7, wherein an m/z value, and an intensity value of a peak of the peak list correspond to an m/z value and an intensity value of a background peak of the exclusion list if the m/z values match within an m/z tolerance factor and if the intensity values match within an intensity tolerance factor.

9. The method of claim 7, wherein scaling the peak list or the exclusion list comprises selecting two or more known background peaks that are on the peak list and the exclusion list, calculating a ratio of a combination of the intensity values of the two or more known background peaks on the peak list and a combination of the intensity values of the two or more known background peaks on the exclusion list, and multiplying each intensity value on the peak list or the exclusion list by the ratio.

10. The method of claim 7, further comprising receiving an ion beam from the ion source device that receives one or more compounds from the control sample over time from a sample introduction device, performing a plurality of MS scans of the mass range at a plurality of different time steps on the ion beam producing background peak m/z and intensity values for background precursor ions over time;

at each time step, selecting one or more of the background peaks of the background precursor ions for the exclusion list, and includes in the exclusion list an m/z value, an intensity value, and a retention time value for each background peak of the selected one or more of the background peaks, receiving an ion beam from the ion source device that receives one or more compounds from the experimental sample over time from the sample introduction device, performing a plurality of MS scans of the mass range at a plurality of different time steps on the ion beam producing peak m/z and intensity values for precursor ions over time, at each time step, selecting one or more of the peaks of the precursor ions for the peak list, and includes in the peak list an m/z value, an intensity value, and a retention time value for each peak of the selected one or more peaks, and excluding from the peak list each peak that has an m/z value, an intensity value, and a retention time value that correspond to an m/z value, an intensity value, and a retention time value of a background peak of the exclusion list.

11. The method of claim 10, wherein an m/z value, an intensity value and a retention time of a peak of the peak list correspond to an m/z value, an intensity value, and a retention time of a background peak of the exclusion list if the m/z values match within an m/z tolerance factor, if the intensity values match within an intensity tolerance factor, and if the retention time values match within a retention time tolerance factor.

12. A computer program product, comprising a non-transitory and tangible computer-readable storage medium whose contents include a program with instructions being executed on a processor so as to perform a method for excluding from a peak list in an information dependent acquisition (IDA) mass spectrometry experiment endogenous background ions that have the same mass-to-charge ratio (m/z) as metabolite ions, the method comprising:

providing a system, wherein the system comprises one or more distinct software modules, and wherein the distinct software modules comprise a control module and an analysis module;

instructing a tandem mass spectrometer to receive an ion beam from an ion source device produced by ionizing a control sample that does not include a metabolite compound using the control module;

instructing the tandem mass spectrometer to perform a mass spectrometry (MS) scan of a mass range on the ion beam producing background peak m/z and intensity values for background precursor ions using the control module;

selecting one or more of the background peaks of the background precursor ions for an exclusion list and including in the exclusion list an m/z value and an intensity value for each background peak of the selected one or more background peaks using the analysis module;

instructing the tandem mass spectrometer to receive an ion beam from the ion source device produced by ionizing an experimental sample that does include the metabolite compound using the control module;

instructing the tandem mass spectrometer to perform an MS scan of the mass range on the ion beam producing peak m/z and intensity values for precursor ions using the control module;

selecting one or more of the peaks of the precursor ions for a peak list and including in the peak list an m/z value and an intensity value for each peak of the selected one or more peaks using the analysis module;

scaling the peak list or the exclusion list by:

selecting one known background peak that is on the peak list and the exclusion list, calculating a ratio of the intensity value of the one known background peak on the peak list and the intensity value of the one known background peak on the exclusion list, and multiplying each intensity value on the peak list or the exclusion list by the ratio; and excluding, after scaling the peak list or the exclusion list, from the peak list each peak that has both an m/z value and an intensity value that correspond to an m/z value and an intensity value of a background peak of the exclusion list using the analysis module.

* * * * *